Nov. 21, 1967     M. D. CEPKAUSKAS ETAL     3,353,566
END CLOSURE FOR NUCLEAR REACTOR CHANNEL
Filed Feb. 24, 1967
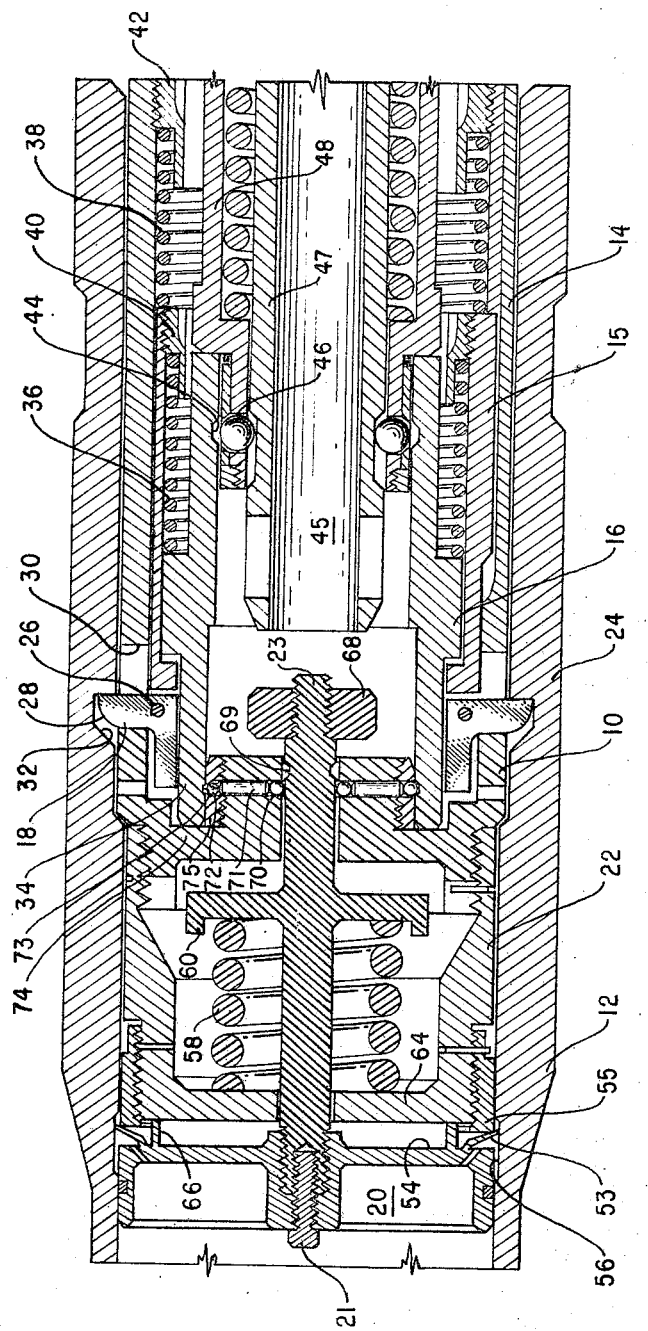
INVENTORS
Martin D. Cepkauskas
John F. Rohlin
Attorney:

United States Patent Office 3,353,566
Patented Nov. 21, 1967

3,353,566
END CLOSURE FOR NUCLEAR REACTOR CHANNEL
Martin D. Cepkauskas, Farmington, and John F. Rohlin, Wapping, Conn., assignors to the United States of America as represented by the United States Atomic Energy Commission
Filed Feb. 24, 1967, Ser. No. 619,135
5 Claims. (Cl. 138—89)

ABSTRACT OF THE DISCLOSURE

An end closure for a fuel or process channel of a nuclear reactor which may be removed from and inserted into the channel by application of solely linear movement. A body portion of the end closure has three coaxial housings and a latch member operated by linear movement of the housings, and a seal member portion has a radially expandable sealing lip which is actuated by its linear movement against an end of one of the housings. A suitable manipulating tool detents into one of the housings and has relatively longitudinally movable coaxial shafts.

Background of invention

The invention described herein was made in the course of, or under Contract AT(28-1)-383 with the U.S. Atomic Energy Commission.

This invention relates to an end closure for a fuel or process channel of a nuclear reactor, and more particularly to an end closure which may be readily disengaged and withdrawn from the channel, and, conversely, inserted therein. The general field of art to which this invention pertains is illustrated by U.S. Patent No. 3,157,579 issued Nov. 17, 1964 in the name of F. S. Hummel.

The need for an end closure for a fuel or process channel which is of simple construction, provides positive sealing, and may be readily disengaged from the channel to facilitate on-power refueling has been recognized in the nuclear reactor art. While many end closures for fuel element channels have been previously proposed, they are generally of complex design, most usually require complex or multiple manipulative steps and/or a removal tool of some complexity employing a number of operating rams to disengage the seal from the seat. It is typical that these proposed end closures do not provide positive actuation of the locking mechanism, and, accordingly, render positive sealing uncertain particularly when relatively movable metal parts of the locking mechanism are subject to galling. In addition, many end closure arrangements proposed for use in fuel element channels require the provision of an elaborate seat in the process channel or a seat that may project into the process channel thereby presenting an obstacle and potential source of damage to fuel elements loaded into the channel.

Summary of the invention

Accordingly, it is an object of this invention to provide an end closure for a fuel or process channel of a nuclear reactor which is of simple construction. It is a further object of this invention to provide an end closure which includes a positively actuated mechanism for locking it into the channel. It is also an object of this invention to provide an end closure which requires only linear movements of a minimum number by a tool of simple construction to disengage it and withdraw it from the channel. It is a still further object of this invention to provide an end closure with a sealing surface that does not require the provision of an elaborate or potentially troublesome sealing seat in the channel.

These and other objects are accomplished by an end closure of the type having a body portion and sealing means portion wherein the body portion includes a first housing dimensioned for disposition within the channel for longitudinal movement therewith, a second housing disposed within the first housing for longitudinal movement therewith between extended and retracted positions, at least one latch means mounted on the second housing for engagement with latch receiving means in the channel through corresponding openings in the first housing when the second housing is in its extended position, a third housing disposed within the second housing for longitudinal movement therewith between extended and retracted positions, the third housing locking the latch means in engaging position when in its extended position, and resilient means for yieldably maintaining the second and third housings in their extended positions. A sealing means portion includes a seal member having a radially expandable sealing lip which is actuable upon engagement of the seal member with an actuating means on the body portion and means for maintaining the engagement of the seal member with the actuating means.

The above and other objects and advantages and summary of the invention will appear from the following description of a preferred embodiment of the invention.

Brief description of drawing

The single figure of drawing shows a cross-sectional side view of a preferred embodiment of an end closure according to the invention and the complementary forward position of a suitable tool for use therewith.

Description of preferred embodiment

As shown in the drawing, end closure 10 is mounted in sealing position within process or fuel channel 12 of a nuclear reactor. End closure 10 has two major functional portions; a body portion for containing and operating a latch mechanism which includes three coaxial housings 14, 15 and 16 and latch member 18, and a sealing means portion including seal member 20 attached to shaft 23 which is coaxially mounted with respect to the body portion for limited relative longitudinal movement therewith.

Referring now to the body portion, first housing 14 is coaxial with and of complementary shape to enlarged portion 24 of channel 12 so as to facilitate sliding longitudinal motion therebetween. Similarly, a second housing, lever or latch housing 15, is disposed within first housing 14, and a third housing, lever stop housing 16, is disposed within lever housing 15 for longitudinal movement therewithin between extended and retracted positions. Generally L-shaped latch levers 18 are pivotedly mounted at 26 to lever housing 15. In the locked position illustrated in the drawing, toe 28 extends through opening 30 in first housing 14 and into locking groove 32 in channel extension 24. Latch actuating portion 34 of lever stop 16 engages the leg of latch 18 maintaining toe 28 in locking position when lever stop 16 is in fully extended position. The fully extended positions of lever stop 16 and latch housing 15 are maintained by the action of resilient means such as springs 36 and 38 acting against spring retainers 40 and 42 fastened in some convenient manner, as by screw threads, to lever housing 15 and first housing 14 respectively.

A tool engagement means such as groove 44, is provided in lever stop 16 so that a complementary shaped tool, such as tool 45 illustrated in the drawing, may be inserted within and locked onto lever stop 16 by a detent arrangement such as balls 46 which lock into groove 44 upon the movement of central shaft 47 forward, or to the left as illustrated on the drawing. The forward movement of shaft 23 is limited by action of stop nut 68 which is dimensioned to receive engagement with central shaft 47 of tool 45, shaft 47 being of hollow construction to permit flow of pressurized coolant therethrough during use. As shaft 47 and, in response, shaft 23 are moved forward, groove 69 is brought into alignment with the safety latch assembly made up of ball 70, roller 71 and ball 72, allowing ball 72 to disengage groove 73 thereby releasing lever stop housing 16 for relative longitudinal rearward movement with respect to latch housing 15. The safety latch assembly is retained in central hub 74 of housing 14 by safety latch assembly retainer 75 which is screw fastened onto hub 74. After the tool is locked onto lever stop 16, and housing 16 released for movement relative to latch housing 15, movement of shaft 48 of tool 45 in the direction toward the end of channel 12, or to the right as represented on the drawing, first moves lever stop 16 toward its retracted position against the action of spring 36 thereby removing latch actuating portion 34 from behind the leg of latch 18. As the movement of the tool is continued, spring 36 is further compressed until the force transmitted against larger spring 38 is sufficient to cause its compression and the movement of lever housing 15 toward its retracted position. As lever housing 15 is moved toward its retracted position, latch 18 is pivoted inwardly and toe 28 disengages locking groove 32.

Referring now to the sealing means portion of end closure 10, housing extension 22 is fastened in some suitable manner, such as by screw threads, to first housing 14 and extends beyond enlarged portion 24 of process channel 12. Shaft 23 extends beyond the end of housing extension 22 and seal member 20 is fastened thereon by some suitable means such as by screw threads and lock screw 21. The head of lock screw 21 may be additionally seal welded to assure against leakage therethrough. Radially expandable sealing lip 53 projects radially outwardly in an oblique manner from transverse rear surface 54 of seal member 20. Sealing lip 53 may be made of any suitable material, metal alloys of the nickel, chromium, iron type having been found to be quite suitable.

It can be seen, then, that the forceable engagement of sealing lip 53 with seal stop 55 on housing extension 22 actuates the seal by causing the radial extension of lip 53 against inner surface 56 of channel 12. Seal stop 55 may be provided, as shown, as a separate annular member in order to permit adjustment thereof to regulate the engagement of lip 53 with surface 56. That small portion of inner surface 56 which lip 53 engages may be machine finished and may be additionally plated with a suitable material material by well known processes, such as flame plating, in order to insure positive sealing therebetween. The forceable engagement of lip 53 with seal stop 55 is maintained by the action of coil spring 58 between flange 60 of shaft 23 and the rear surface of end wall 64 of housing extension 22. A spacer, such as annular projection 66 on the rear surface of seal member 20, is provided between seal member 20 and end wall 64 to limit the force exerted on lip 53.

The operation of the end closure in accordance with the foregoing description will now be understood. Removal tool 45 may be inserted into the rear of end closure 10 to a position where its complementary shaped outer head portion is brought into locking engagement with lever stop housing 16 by the cooperative action of detents in the tool head, i.e., balls 46, with locking groove 44 of lever stop housing 16. A relatively longitudinally movable center portion of the tool, shaft 47, is then moved longitudinally forward to make engagement with stop nut 68 at the end of shaft 23. Continued movement of shaft 47 moves shaft 23 in the forward direction taking lip 53 out of engagement with seal stop surface 55 thereby permitting it to relax and contract radially and releasing the safety latch mechanism which locks housings 15 and 16 together by bringing groove 69 into alignment with ball 70. Shaft 48 of the tool is then moved linearly in the rearward direction successively moving housings 16 and 15 with it so as to release toe 28 of latch 18 from locking groove 32 in the manner described above. End closure 10 can then be removed by further linear movement of the tool in the rearward direction. It will be understood by those skilled in the art that the insertion of the end closure in the channel requires merely the reverse order of the described manipulations.

Accordingly, it can be seen that the described end closure is of very simple construction and can be removed from and inserted into a process or fuel element channel by the application of solely linear movements thereto by a removal tool of uncomplicated design and construction. While a particular complementary tool for operating the end closure in accordance with the invention has been shown in the drawing and its basic parts described, other particular configurations of satisfactory complementary tools will come readily to mind to those skilled in the art from the foregoing description of the end closure. The only requirements of such tool are that it have an outer portion which locks into engagement with lever stop 16 and an inner portion relatively movable with respect to the outer portion for manipulating shaft 23.

While the fundamental novel features of the invention have been described in relation to a preferred embodiment, it will be understood that various omissions, substitutions and/or changes in the form and details of the device illustrated, and in its operation, may be made by those skilled in the art without departing from the spirit of the invention, the scope of which is limited only as indicated by the appended claims.

We claim:

1. An end closure for a fuel element or process channel of a nuclear reactor of the type having a body portion and sealing means portion wherein an improved body portion comprises a first housing dimensioned for disposition within said channel for longitudinal movement therewith, a second housing disposed within said first housing for longitudinal movement therewith between extended and retracted positions, at least one latch means mounted on said second housing for engagement with latch receiving means in said channel through corresponding openings in said first housing when said second housing is in its extended position, a third housing disposed within said second housing for longitudinal movement therewith between extended and retracted positions, said third housing locking said latch means in engaging position when in its extended position, and resilient means for yieldably maintaining said second and said third housings in their extended positions.

2. The end closure of claim 1 wherein said sealing means portion comprises a seal member having radially expandable sealing means, said body portion has means for actuating said sealing means upon engagement with said seal member, and means are provided for maintaining said engagement of said seal member with said actuating means.

3. The end closure of claim 2 wherein said sealing means portion is mounted on the end of a shaft coaxially mounted in said body portion for longitudinal movement therewith and said means for maintaining the engagement of said seal member with said actuating means is a resilient means acting between said shaft and body member.

4. The end closure of claim 1 wherein said second and third housings are maintained in said extended positions by resilient means between said first and second housings and between said second and said third housings respectively.

5. The end closure of claim 4 wherein said latch means is a generally L-shaped member pivotally mounted to said second housing with the toe portion extending into said locking groove of said channel when the leg portion is in engagement with said third housing.

References Cited

UNITED STATES PATENTS

| 3,125,123 | 3/1964 | Roche et al. | 176—30 |
| 3,140,730 | 7/1964 | Costes | 176—30 |

FOREIGN PATENTS

| 1,009,381 | 11/1965 | Great Britain. |

CARL D. QUARFORTH, *Primary Examiner.*

H. E. BEHREND, *Assistant Examiner.*